United States Patent
Fu et al.

(10) Patent No.: US 11,856,561 B2
(45) Date of Patent: Dec. 26, 2023

(54) DETERMINING A FEEDBACK CODEBOOK

(71) Applicant: ZTE Corporation, Guangdong (CN)

(72) Inventors: Ting Fu, Guangdong (CN); Wei Gou, Guangdong (CN); Peng Hao, Guangdong (CN); Chenchen Zhang, Guangdong (CN); Haigang He, Guangdong (CN)

(73) Assignee: ZTE Corporation, Guangdong (CN)

( * ) Notice: Subject to any disclaimer, the term of this patent is extended or adjusted under 35 U.S.C. 154(b) by 397 days.

(21) Appl. No.: 17/306,270

(22) Filed: May 3, 2021

(65) Prior Publication Data
US 2021/0274497 A1    Sep. 2, 2021

Related U.S. Application Data

(63) Continuation of application No. PCT/CN2018/113825, filed on Nov. 2, 2018.

(51) Int. Cl.
*H04W 72/0446* (2023.01)
*H04W 72/23* (2023.01)
(Continued)

(52) U.S. Cl.
CPC ....... *H04W 72/0446* (2013.01); *H04W 72/23* (2023.01)

(58) Field of Classification Search
CPC . H04W 72/0446; H04W 72/23; H04W 72/12; H04W 72/1263; H04L 1/1861; H04L 5/0055; H04L 1/1854
See application file for complete search history.

(56) References Cited

U.S. PATENT DOCUMENTS 10,873,964 B2   12/2020   Lee et al.
2014/0204849 A1   7/2014   Chen et al.
(Continued)

FOREIGN PATENT DOCUMENTS

CN   104938014 A   9/2015
CN   108293248 A   7/2018
(Continued)

OTHER PUBLICATIONS

Singapore Patent Office, Search Report and Written Opinion dated Aug. 16, 2022 for Singapore Patent Application No. 11202104555U, 11 pages.
(Continued)

*Primary Examiner* — Harry H Kim
(74) *Attorney, Agent, or Firm* — Perkins Coie LLP

(57) ABSTRACT

In one aspect a wireless communications method includes sending, from a first radio terminal to a second radio terminal, a grant message to allow transmission in a future time slot, wherein the future timeslot corresponds to resources of a dummy shared channel in a first direction, and scheduling one or more resources of a shared channel in a second direction with corresponding acknowledgement that overlaps in time with the dummy shared channel in the first direction. In another aspect, a method includes receiving, at a second radio terminal from a first radio terminal, a grant message to allow transmission in a future time slot, wherein the future timeslot corresponds to resources of a dummy shared channel in a first direction, and receiving one or more resources of a shared channel in a second direction with corresponding acknowledgement that overlaps in time with the dummy shared channel in the first direction.

20 Claims, 10 Drawing Sheets

(51) Int. Cl.
  H04L 1/1829 (2023.01)
  H04L 5/00 (2006.01)
  H04W 72/12 (2023.01)
  H04W 72/1263 (2023.01)

(56) References Cited

U.S. PATENT DOCUMENTS

| | | | |
|---|---|---|---|
| 2015/0146643 A1 | 5/2015 | Fu et al. | |
| 2016/0173260 A1 | 6/2016 | Fan et al. | |
| 2016/0338089 A1 | 11/2016 | Vos | |
| 2017/0207845 A1* | 7/2017 | Moon | H04B 7/0695 |
| 2017/0303306 A1 | 10/2017 | Lee et al. | |
| 2018/0006791 A1 | 1/2018 | Marinier et al. | |
| 2018/0115940 A1* | 4/2018 | Abedini | H04W 56/004 |
| 2018/0167934 A1 | 6/2018 | Seo et al. | |
| 2019/0037586 A1 | 1/2019 | Park et al. | |
| 2020/0008227 A1 | 1/2020 | Lee et al. | |
| 2020/0145280 A1* | 5/2020 | Cirik | H04L 41/0668 |
| 2021/0036810 A1 | 2/2021 | Mu et al. | |
| 2022/0029761 A1* | 1/2022 | Su | H04L 27/2613 |

FOREIGN PATENT DOCUMENTS

| | | |
|---|---|---|
| CN | 108513714 A | 9/2018 |
| EP | 3471309 A1 | 4/2019 |
| EP | 4087353 A1 | 11/2022 |
| WO | 2016048100 A1 | 3/2016 |
| WO | 2017076601 A1 | 5/2017 |
| WO | 2017196249 A1 | 11/2017 |
| WO | 2018128493 A1 | 7/2018 |
| WO | 2018/174450 A1 | 9/2018 |
| WO | 2018230999 A1 | 12/2018 |

OTHER PUBLICATIONS

Qualcomm Incorporated, "Summary of UCI multiplexing on PUSCH," 3GPP TSG RAN WG1 Meeting #94bis, R1-1812021, Chengdu, China, Oct. 8-12, 2018, 17 pages.
Extended European Search Report for EP Patent Application No. 18930384.5, dated Sep. 28, 2021, 8 pages.
Chinese Patent Office, First Office Action dated Dec. 1, 2022 for Chinese Patent Application No. 2018800993059, 8 pages (with English translation).
EPO, Communication pursuant to Article 94(3) EPC for European Application No. 18930384.5, dated May 16, 2023, 4 pages.
CNIPA, Notification to Complete Formalities of Registration for Chinese Application No. 201880099305.9, dated May 22, 2023, 6 pages with unofficial translation.
IPOS, Notice of Eligibility of Grant and Final Examination Report for Singaporean Application No. 11202104555U, dated Jun. 6, 2023, 6 pages.
KIPO, Office Action for Korean Application No. 10-2021-7016915, dated Mar. 23, 2023, 9 pages with unofficial translation.
International Search Report and Written Opinion in International Application No. PCT/CN2018/113825, dated Jul. 25, 2019, 7 pages.
Fujitsu, "Discussion on I-IARQ-ACK feedback over PUCCH and PUSCH" R1-1810596, 3GPP TSG RAN WG1 Meeling #94bis, Oct. 12, 2018 (Oct. 12, 2018), 5 pages.
LG Electronics, "Discussion on DL/UL data scheduling and HARQ procedure" R1-1810258, 3GPP TSG RAN WG1 Meeting #94bis, Oct. 12, 2018 (Oct. 12, 2018), 12 pages.
ZTE. "Discussion on HARQ-ACK feedback over PUCCH and PUSCH" R1-1810328, 3GPP TSG RAN WG1 Meeting #94bis. Oct. 12, 2018 (Oct. 12, 2018), 5 pages.
KIPO, Final Rejection for Korean Application No. 10-2021-7016915, dated Oct. 26, 2023, 6 pages with unofficial translation.

* cited by examiner

DETERMINING A FEEDBACK CODEBOOK

CROSS-REFERENCE TO RELATED APPLICATIONS

This application is a continuation of International Patent Application No. PCT/CN2018/113825, filed on Nov. 2, 2018, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity, connectivity, and reliability. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This document discloses methods, systems, apparatuses, and computer readable media related to wireless communication, and in particular to a method and apparatus for scheduling in a 5G system and determining a feedback codebook size.

In one aspect a method of wireless communication is disclosed. The method includes sending, from a first radio terminal to a second radio terminal, a grant message to allow transmission in a future time slot, wherein the future timeslot corresponds to resources of a dummy shared channel in a first direction. The method includes scheduling one or more resources of a shared channel in a second direction with corresponding acknowledgement that overlaps in time with the dummy shared channel in the first direction. The following examples are not intended to be limiting. Although specific communications equipment is listed, other equipment may be used in their place. In some example embodiments, the first radio terminal is a base station such as an enhanced node B (eNB) or a next generation node B (gNB) or another base station. The second radio terminal may be a user equipment, mobile terminal, handset, smartphone, cell phone, or other mobile device. The dummy shared channel in the first direction may be a dummy physical uplink shared channel (PUSCH) or another communications resource. The shared channel in the second direction may be a physical downlink shared channel (PDSCH) or another communications resource. The acknowledgement message may be a hybrid automatic repeat request acknowledgement (HARQ-ACK) or another acknowledgement or ACK/NACK message. The assignment indicator may be a downlink assignment indicator (DAI) or other assignment message or indicator. The first direction may correspond to an uplink and the second direction may correspond to a downlink.

In another aspect, another method for wireless communication is disclosed. The method includes sending, from a first radio terminal to a second radio terminal, a grant to allow transmission in a future time slot, wherein the future timeslot corresponds to resources of a non-dummy shared channel in a first direction. The method further includes forbidding the scheduling of one or more resources of a shared channel in the second direction with corresponding acknowledgement that overlaps in time with the non-dummy shared channel in a first direction.

In another aspect, another method for wireless communication is disclosed. The method includes sending, from a first radio terminal to a second radio terminal, a grant message to allow transmission in a future time slot, wherein the future timeslot corresponds to resources of a dummy shared channel in a first direction. The method further includes sending one or more subsequent grants to schedule resources of a shared channel in a second direction with an acknowledgement that overlaps in time with the dummy shared channel in the first direction, and receiving a feedback acknowledgement codebook with a number of bits determined by an assignment indicator in a last sent grant.

In another aspect, another method for wireless communication is disclosed. The method includes sending, from a first radio terminal to a second radio terminal, a grant message to allow transmission in a future time slot, wherein the future timeslot corresponds to resources of a dummy shared channel in a first direction. The method further includes receiving a feedback acknowledgement codebook with a number of bits determined by an assignment indicator in a last sent grant when the first radio terminal does not send one or more subsequent grants to schedule resources of the shared channel in a second direction with an acknowledgement that overlaps in time with the dummy shared channel in a first direction.

In another aspect, another method for wireless communication is disclosed. The method includes receiving, at a second radio terminal from a first radio terminal, a grant message to allow transmission in a future time slot, wherein the future timeslot corresponds to resources of a dummy shared channel in a first direction. The method includes receiving one or more resources of a shared channel in a second direction with corresponding acknowledgement that overlaps in time with the dummy shared channel in the first direction.

In another aspect, another method for wireless communication is disclosed. The method includes receiving, at a first radio from to a second radio terminal, a grant to allow transmission in a future time slot, wherein the future timeslot corresponds to resources of a non-dummy shared channel in a first direction. The method further includes failing to receive via one or more resources of a shared channel in the second direction with corresponding acknowledgement that overlaps in time with the non-dummy shared channel in a first direction.

In another aspect, another method for wireless communication is disclosed. The method includes receiving, at a first radio terminal from a second radio terminal, a grant message to allow transmission in a future time slot, wherein the future timeslot corresponds to resources of a dummy shared channel in a first direction. The method further includes receiving one or more subsequent grants to schedule resources of a shared channel in a second direction with an acknowledgement that overlaps in time with the dummy shared channel in the first direction. The method further includes sending feedback acknowledgement codebook with a number of bits determined by an assignment indicator in a last received grant.

In another aspect, another method for wireless communication is disclosed. The method includes receiving, at a first radio terminal from a second radio terminal, a grant message to allow transmission in a future time slot, wherein the future timeslot corresponds to resources of a dummy shared channel in a first direction. The method further includes sending a feedback acknowledgement codebook with a number of bits determined by an assignment indicator in a last received grant when the second radio terminal does not receive one or more subsequent grants to schedule resources of the shared channel in a second direction with an acknowledgement that overlaps in time with the dummy shared channel in a first direction.

The details of one or more implementations are set forth in the accompanying attachments, the drawings, and the description below. Other features will be apparent from the description and drawings, and from the claims.

DETAILED DESCRIPTION

Section headings are used in the present document only to improve readability and do not limit scope of the disclosed embodiments and techniques in each section to only that section.

With the development of wireless communication technologies, the performance including transmission rate, delay, throughput, and reliability has been improved through various technologies. However, to achieve high-performance wireless transmission, user equipment (also referred to as a terminal or UE) must perform more complex processing to meet the performance requirements. For example, a UE that detects a larger control channel bandwidth is subject to more complex control information including data encoding, decoding processing, and the like. A UE that operate at high frequencies may use a large bandwidth to achieve a high data rate or high-capacity transmission. This may use more computational resources.

Dynamic Hybrid Automatic Repeat Request (HARQ) Feedback Codebook in 5G NR (New Radio) System HARQ feedback can be sent to a base station (BS) on a physical uplink control channel (PUCCH) channel or a physical uplink shared channel (PUSCH) channel. In the current 5G specification, if the resource used HARQ feedback information does not overlap (fully or partially) with the PUSCH channel in the time domain, the HARQ feedback information will be transmitted in the PUCCH channel, if the resource used by HARQ feedback information overlap with the PUSCH channel, the HARQ feedback information will be multiplexed in the PUSCH channel and transmitted in PUSCH channel.

1. For HARQ feedback sent on the PUCCH channel. Each dynamically transmitted physical downlink shared channel (PDSCH) has the corresponding downlink (DL) grant scheduling information, which contains DL downlink assignment indicator (DAI) to indicate the number of HARQ feedback bits There may be cases where multiple dynamically scheduled PDSCHs feed back HARQ information on the same PUCCH time-frequency resource. The number of HARQ bits that are fed back on this PUCCH resource (that is, the size of the HARQ feedback codebook) is indicated by the DL DAI in the last DL grant.

Figure 1:
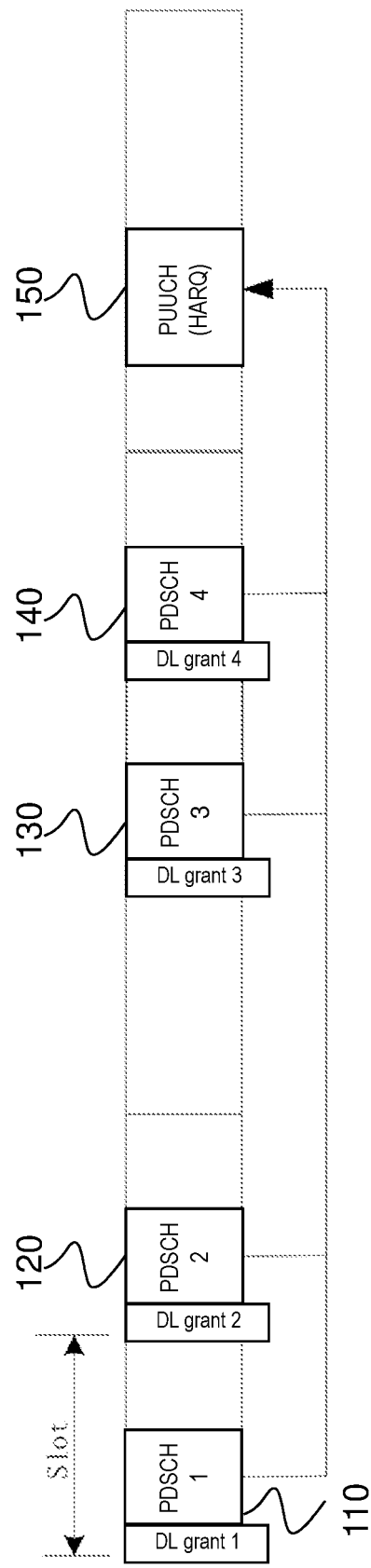
FIGS. 1-7 depict various allocations of communications resources, in accordance with various example embodiments.

As shown in FIG. 1, the number of HARQ bits fed back on the PUCCH resource is indicated by the DL DAI in the DL grant 4 140.

2. For HARQ feedback information multiplexed on the PUSCH channel to send the status. When the time-frequency resources of the HARQ-Acknowledgment (ACK) feedback for PDSCH overlap with the time-frequency resources of a PUSCH scheduled by uplink (UL) grant scheduling in time domain, the HARQ-ACK feedback bits will be multiplexed in PUSCH channel and transmitted in PUSCH channel. In order to avoid the UE missing the DL grant and PDSCH and cause inconsistency between the number of HARQ-ACK bits feedback by UE and the number of HARQ-ACK bits that BS expect the UE to feedback, the base station will send UL grant to carry UL DAI instructions.

The UL DAI instruction indicates the number of bits of HARQ-ACK that need feedback on the PUSCH of the UL grant.

Figure 2:
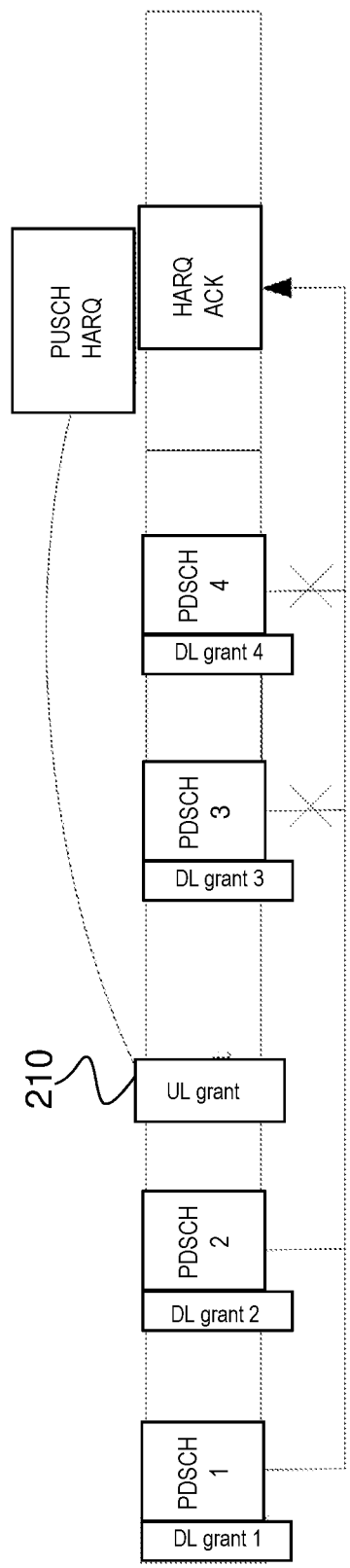

Since the UE may begin to prepare for the PUSCH after receiving the UL grant, if after the UL grant, the base station continues to schedule PDSCH and its corresponding HARQ-ACK feedback overlap with the above PUSCH in the time domain. The HARQ-ACK information corresponding to the PDSCH that may not be able to be multiplexed in PUSCH, because at this time PUSCH has already started preparation and cannot stop to multiplex additional information bits. In order to avoid HARQ-ACK information that cannot be multiplexed to PUSCH, the following scheduling restrictions can be made: after the UL grant, the base station can no longer schedule PDSCH so that its corresponding HARQ-ACK feedback is also multiplexed on the PUSCH. This is shown in FIG. 2.

In the current standard, there is a case where an "dummy PUSCH" is dynamically scheduled. That is, the UL grant command is used to instruct the UE to measure the pilot signal for beam management, etc., but the UE does not need to report A-CSI (asymmetric channel state information) on the scheduled PUSCH, and does not need any uplink data (ie, UL-SCH) transmitted on the PUSCH. That is, the PUSCH is a dummy PUSCH.

If the dummy (also referred to as null) PUSCH overlaps with the PUCCH channel in the time domain, for example, the null PUSCH overlaps with the HARQ-ACK information, then the PUCCH is not multiplexed into the PUSCH but transmitted directly on the PUCCH channel. For the UE, the dummy PUSCH may be considered to not exist.

In the foregoing scenario, two new problems may occur.

1. Whether the UL grant scheduling the dummy PUSCH forming a restriction on subsequent PDSCH scheduling. That is, after the UL grant of the dummy PUSCH, whether the base station can continue to dynamically schedule PDSCH, and its HARQ-ACK feedback resource overlaps with the dummy PUSCH.

2. Whether the number of bits of HARQ feedback still be determined according to the UL DAI in the UL grant for dummy PUSCH.

The techniques disclosed in this document solve the foregoing issues as well as other issues.

1. After the UE receives the UL grant for scheduling the empty PUSCH, the UE may continue to receive the dynamic scheduling signaling DL grant and the corresponding PDSCH, and the HARQ-ACK feedback resource of the PDSCHs overlaps with the null PUSCH in the time domain. At the base station, after the base station schedules the UL grant of the null PUSCH, the base station may further dynamically schedule the PDSCH, and the HARQ-ACK feedback resource of the PDSCHs overlaps with the null PUSCH in the time domain. One reason is: due to HARQ the feedback information is transmitted on the PUCCH channel originally allocated by the base station to the UE, and is not multiplexed into the PUSCH. Therefore, there is no case where the HARQ feedback information cannot be multiplexed into the PUSCH, so the scheduling restriction should be canceled, and after the UL grant of the null PUSCH is scheduled, the base station may further dynamically schedule the PDSCH, and the HARQ-ACK feedback resource of the PDSCHs overlaps with the empty PUSCH in time domain.

There will not be the above existing technology described in the HARQ feedback information cannot be reused to PUSCH situation, so the scheduling limit should be removed, After the UL grant of a dummy PUSCH is allowed, the base station can continue to dynamically schedule PDSCH, and its HARQ-ACK feedback resources overlap with the dummy PUSCH time domain.

2. After the UE receives the UL grant of the dummy PUSCH, if the UE receives the dynamic scheduling signaling DL grant and the corresponding PDSCH, and its HARQ-ACK feedback resource overlaps with the dummy PUSCH. Then, the UE determines the number of bits of the HARQ-ACK feedback according to the DL DAI indication carried by the last DL grant in the above DL grants received after the UL grant. If the UE does not receive the dynamic scheduling signaling DL grant and the corresponding PDSCH after receiving the UL grant scheduling the dummy PUSCH, the HARQ-ACK feedback resource overlaps with the dummy PUSCH. Then the UE will determine the number of bits of the HARQ-ACK feedback according to the UL DAI indication carried in the UL grant for dummy PUSCH.

3. If the UE receives a UL grant schedules a "non-dummy PUSCH" (i.e., there are A-CSI and/or UL-SCH in the PUSCH), the UE does not expect to multiplex in the non-dummy PUSCH the HARQ-ACK of the PDSCH scheduled by DL grant which is transmitted after the UL grant.

The limitation on the subsequent PDSCH scheduling due to the UL grant scheduling dummy PUSCH in the existing protocol is avoided. At the same time, a method for determining the size of the HARQ feedback codebook after canceling the scheduling restriction is also proposed.

Figure 3:
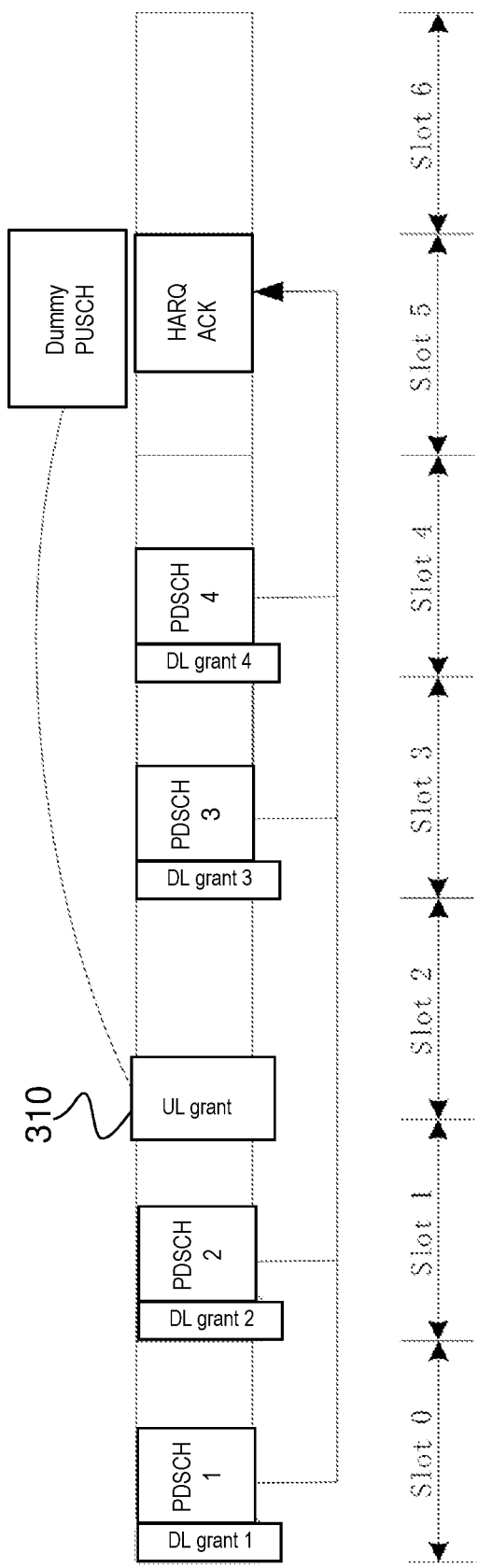

FIG. 3 shows a base station that dynamically schedules 2 PDSCH for the UE at slot 0/1 and schedules a dummy PUSCH in slot 3 using UL grant 310.

The empty PUSCH in slot 5 and the HARQ feedback resource corresponding to PDSCH 1/2 overlap in the time domain. After the UL grant for dummy PUSCH, the base station scheduled PDSCH 3/4 on slot 3/4 for the UE, and its HARQ feedback resources were the same as the PDSCH1/2 HARQ feedback resources. The UE received 4 DL grant/PDSCH and UL grant scheduled by the base station. The UE will determine the number of bits of HARQ feedback based on the DL DAI carried by the last DL grant 4. The HARQ feedback is transmitted in the PUCCH channel.

Figure 4:
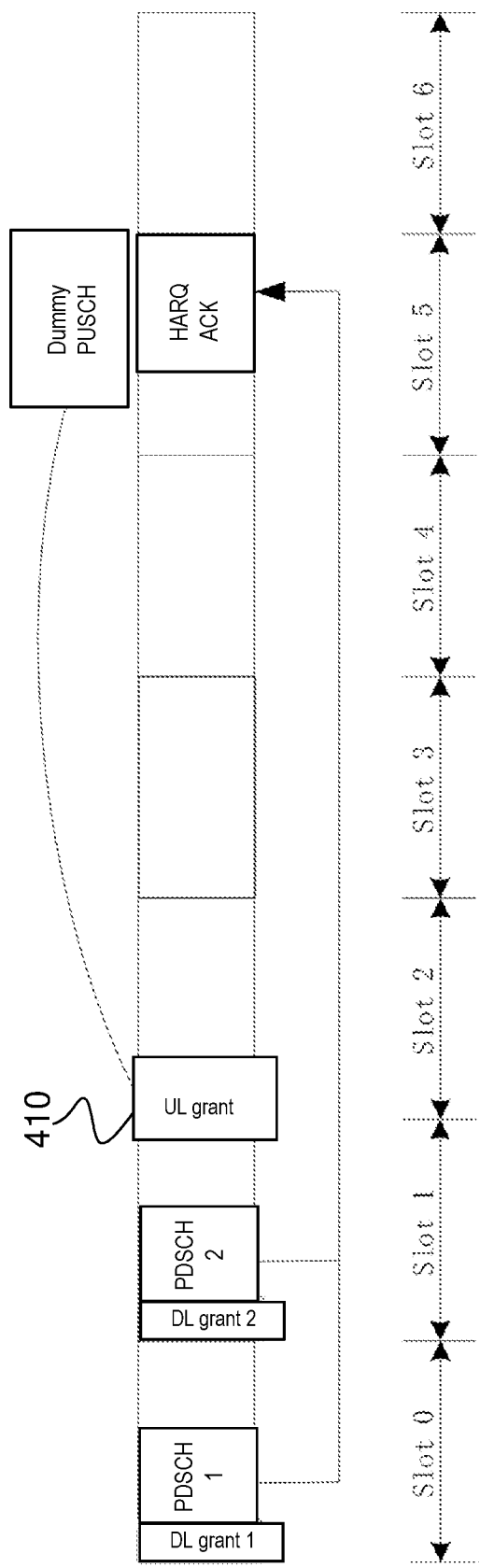

As shown in FIG. 4, the base station dynamically schedules 2 PDSCH for the UE at slot 0/1 and schedules an empty PUSCH in slot 3 using UL grant 410.

The empty PUSCH in slot 5 and the HARQ feedback resource corresponding to PDSCH 1/2 overlap in the time domain. After the UL grant, the UE did not receive any PDSCH. The UE will determine the number of bits of HARQ feedback in accordance with UL DAI carried by UL grant for dummy PUSCH. The HARQ feedback is transmitted in the PUCCH channel.

Figure 5:
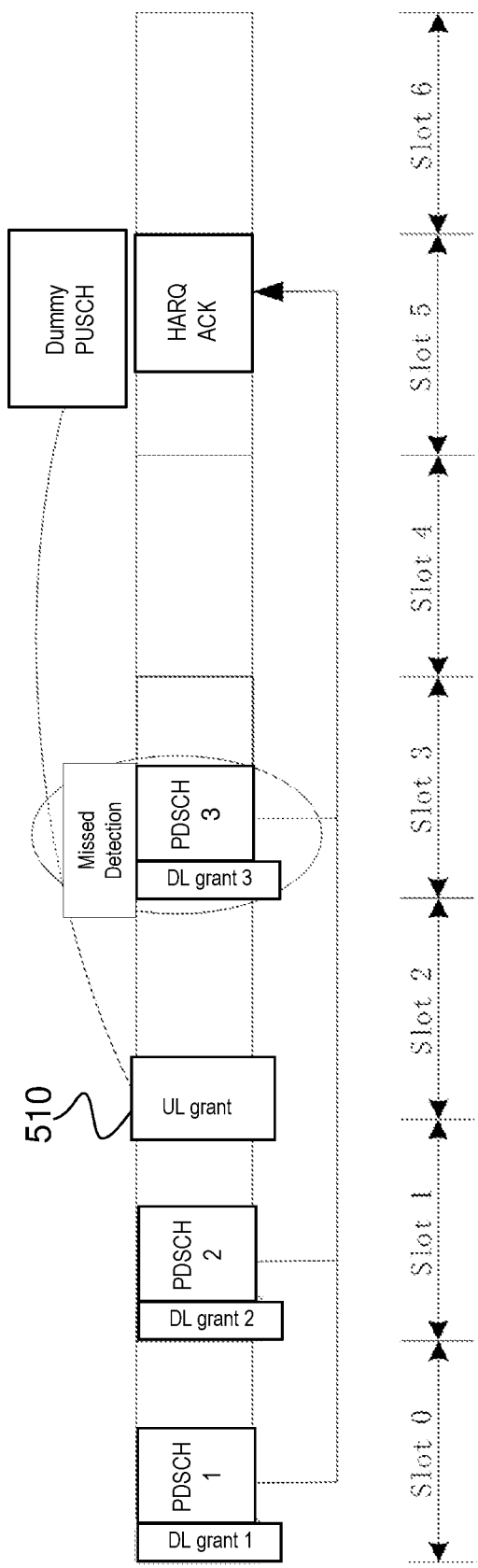

As shown in FIG. 5, the base station dynamically schedules 2 PDSCH for the UE at slot 0/1 and schedules an empty PUSCH in slot 3 using UL grant 510.

The empty PUSCH in slot 5 and the HARQ feedback resource corresponding to PDSCH 1/2 overlap in the time domain. After the UL grant 510, on slot 3, the base station scheduled PDSCH 3/4 for the UE, and its HARQ feedback resources were the same as PDSCH1/2 HARQ feedback resources. But the UE missed the DL grant 3, so it also missed PDSCH 3. So UE received the DL grant 1/2 and PDSCH1/2 as well as UL grant for dummy PUSCH. The UE will determine the number of bits of HARQ feedback in accordance with UL DAI carried by the UL grant. The HARQ feedback is transmitted in the PUCCH channel.

Figure 6:
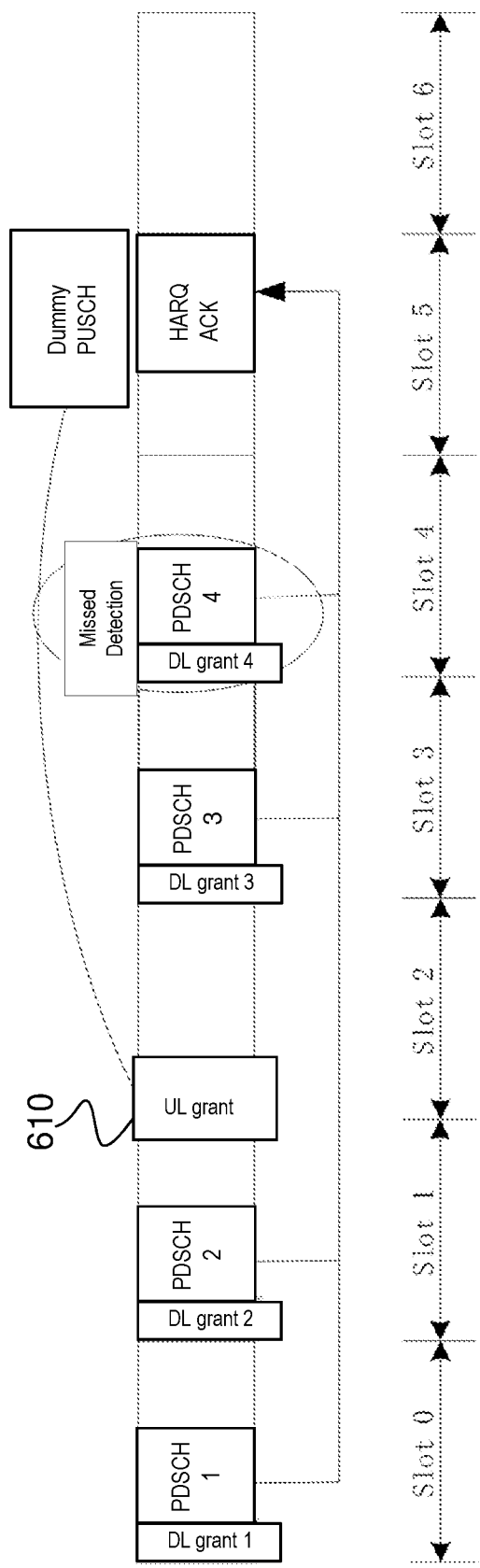

As shown in FIG. 6, the base station dynamically schedules 2 PDSCH for the UE at slot 0/1 and schedules a dummy PUSCH in slot 3 using UL grant.

The empty PUSCH in slot 5 and the HARQ feedback resource corresponding to PDSCH 1/2 overlap in the time domain. After the UL grant, on slot 3/4, the base station schedules PDSCH 3/4 for the UE, and its HARQ feedback resources are the same as PDSCH1/2 HARQ feedback resources. But the UE missed DL Grant 3, so it also missed the PDSCH 3. The UE received 3 DL grants/PDSCHs and UL grant scheduled by the base station. The UE will determine the number of bits of HARQ feedback based on the DL DAI received in the last DL Grant 3. The HARQ feedback is transmitted in the PUCCH channel.

Figure 7:
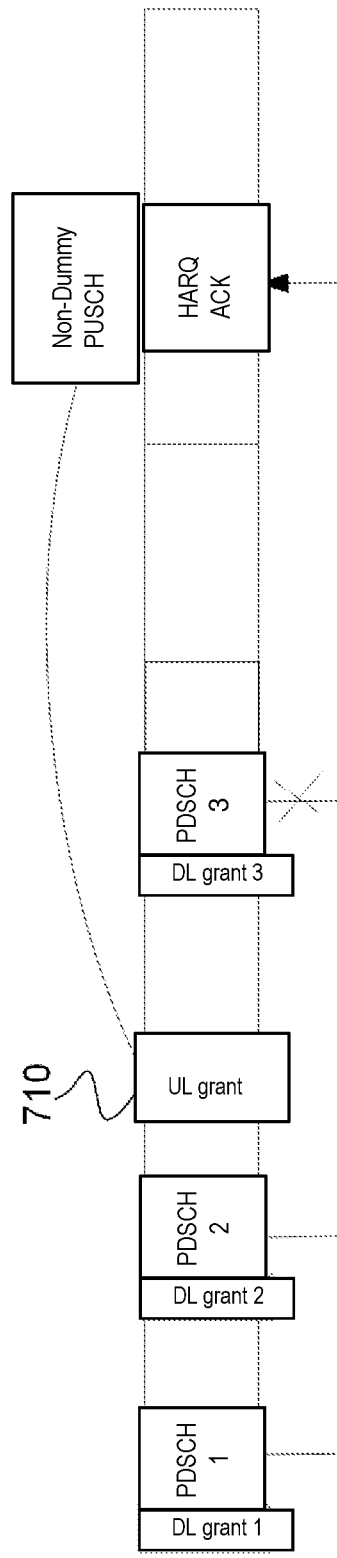

As shown in FIG. 7, the base station dynamically schedules two PDSCHs for the UE in slot 0/1 and schedules a non-dummy PUSCH using the UL grant in slot 3. The non-dummy PUSCH has A-CSI and/or UL-SCH information. The non-dummy PUSCH is in slot 5 and the HARQ feedback resources corresponding to PDSCH 1/2 overlap in the time domain.

After the UL grant, the base station should be prohibited from scheduling the PDSCH, and the corresponding HARQ-ACK feedback information overlaps with the non-empty PUSCH. For example, in FIG. 7, the scheduling of PDSCH 3 is not allowed.

And after the UL grant, the UE does not expect to receive one or more PDSCHs with corresponding HARQ-ACK overlappped with the non-dummy PUSCH, that means the UE does not expect to multiplex in the non-dummy PUSCH the HARQ-ACK of the PDSCH scheduled by DL grant which is transmitted after the UL grant. For example, in FIG. 7, UE does not expect to multiplex HARQ-ACK of PDSCH 3 into the non-dummy PUSCH 3.

Figure 8:
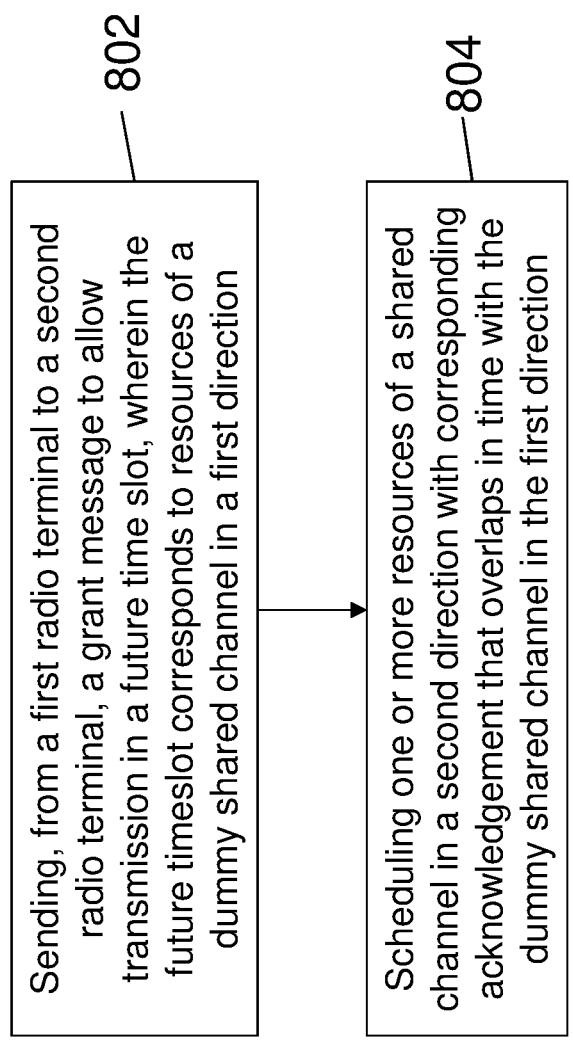
FIG. 8 depicts a process, in accordance with some example embodiments.

FIG. 8 depicts a process, in accordance with some example embodiments. The process includes a method of wireless communication. At 802, the method includes sending, from a first radio terminal to a second radio terminal, a grant message to allow transmission in a future time slot, wherein the future timeslot corresponds to resources of a dummy shared channel in a first direction. At 804, the method includes scheduling one or more resources of a shared channel in a second direction with corresponding acknowledgement that overlaps in time with the dummy shared channel in the first direction. The following examples are not intended to be limiting. Although specific communications equipment is listed, other equipment may be used in their place. In some example embodiments, the first radio terminal is a base station such as an enhanced node B (eNB) or a next generation node B (gNB) or another base station. The second radio terminal may be a user equipment, mobile terminal, handset, smartphone, cell phone, or other mobile device. The dummy shared channel in the first direction may be a dummy physical uplink shared channel (PUSCH) or another communications resource. The shared channel in the second direction may be a physical downlink shared channel (PDSCH) or another communications resource. The acknowledgement message may be a hybrid automatic repeat request acknowledgement (HARQ-ACK) or another acknowledgement or ACK/NACK message. The assignment indicator may be a downlink assignment indicator (DAI) or other assignment message or indicator. The first direction may correspond to an uplink and the second direction may correspond to a downlink.

Another process includes a method for wireless communication. The method includes sending, from a first radio terminal to a second radio terminal, a grant to allow transmission in a future time slot, wherein the future timeslot corresponds to resources of a non-dummy shared channel in a first direction. The method further includes forbidding the scheduling of one or more resources of a shared channel in the second direction with corresponding acknowledgement that overlaps in time with the non-dummy shared channel in a first direction.

Another process includes a method for wireless communication. The method includes sending, from a first radio terminal to a second radio terminal, a grant message to allow transmission in a future time slot, wherein the future timeslot corresponds to resources of a dummy shared channel in a first direction. The method further includes sending one or more subsequent grants to schedule resources of a shared channel in a second direction with an acknowledgement that overlaps in time with the dummy shared channel in the first direction, and receiving a feedback acknowledgement codebook with a number of bits determined by an assignment indicator in a last sent grant.

Another process includes a method for wireless communication. The method includes sending, from a first radio terminal to a second radio terminal, a grant message to allow transmission in a future time slot, wherein the future timeslot corresponds to resources of a dummy shared channel in a first direction. The method further includes receiving a feedback acknowledgement codebook with a number of bits determined by an assignment indicator in a last sent grant when the first radio terminal does not send one or more subsequent grants to schedule resources of the shared channel in a second direction with an acknowledgement that overlaps in time with the dummy shared channel in a first direction.

Figure 9:
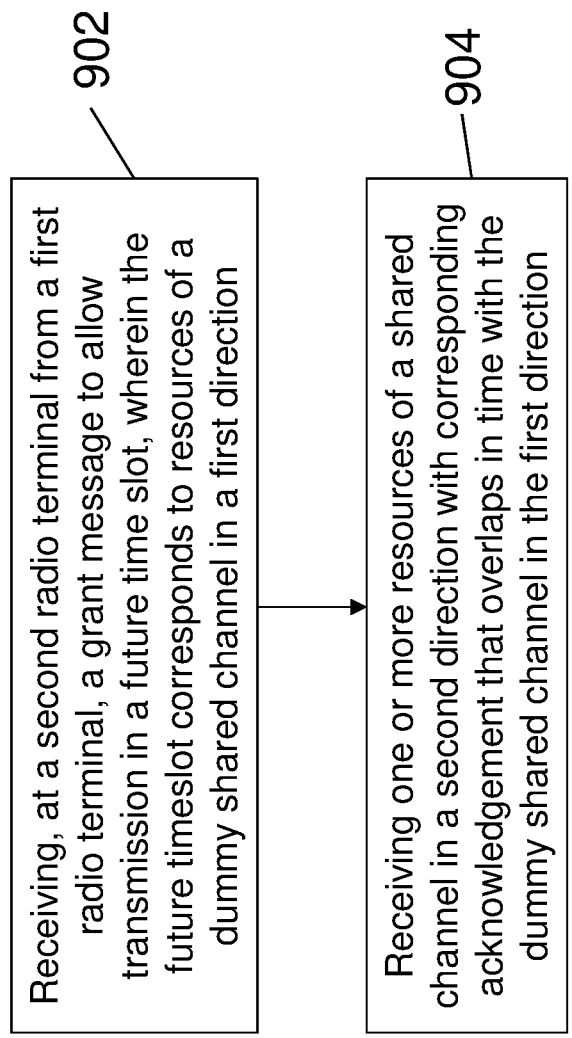
FIG. 9 depicts another process, in accordance with some example embodiments.

FIG. 9 depicts another process, in accordance with some example embodiments. The process includes a method of wireless communication. At 602, the method includes receiving, at a second radio terminal from a first radio terminal, a grant message to allow transmission in a future time slot, wherein the future timeslot corresponds to resources of a dummy shared channel in a first direction. At 902, the method includes receiving one or more resources of a shared channel in a second direction with corresponding acknowledgement that overlaps in time with the dummy shared channel in the first direction.

Another process includes a method for wireless communication. The method includes receiving, at a first radio from to a second radio terminal, a grant to allow transmission in a future time slot, wherein the future timeslot corresponds to resources of a non-dummy shared channel in a first direction. The method further includes failing to receive via one or more resources of a shared channel in the second direction with corresponding acknowledgement that overlaps in time with the non-dummy shared channel in a first direction.

Another process includes a method for wireless communication. The method includes receiving, at a first radio terminal from a second radio terminal, a grant message to allow transmission in a future time slot, wherein the future timeslot corresponds to resources of a dummy shared channel in a first direction. The method further includes receiving one or more subsequent grants to schedule resources of a shared channel in a second direction with an acknowledgement that overlaps in time with the dummy shared channel in the first direction. The method further includes sending feedback acknowledgement codebook with a number of bits determined by an assignment indicator in a last received grant.

Another process includes a method for wireless communication. The method includes receiving, at a first radio terminal from a second radio terminal, a grant message to allow transmission in a future time slot, wherein the future timeslot corresponds to resources of a dummy shared channel in a first direction. The method further includes sending a feedback acknowledgement codebook with a number of bits determined by an assignment indicator in a last received grant when the second radio terminal does not receive one or more subsequent grants to schedule resources of the shared channel in a second direction with an acknowledgement that overlaps in time with the dummy shared channel in a first direction.

Figure 10:
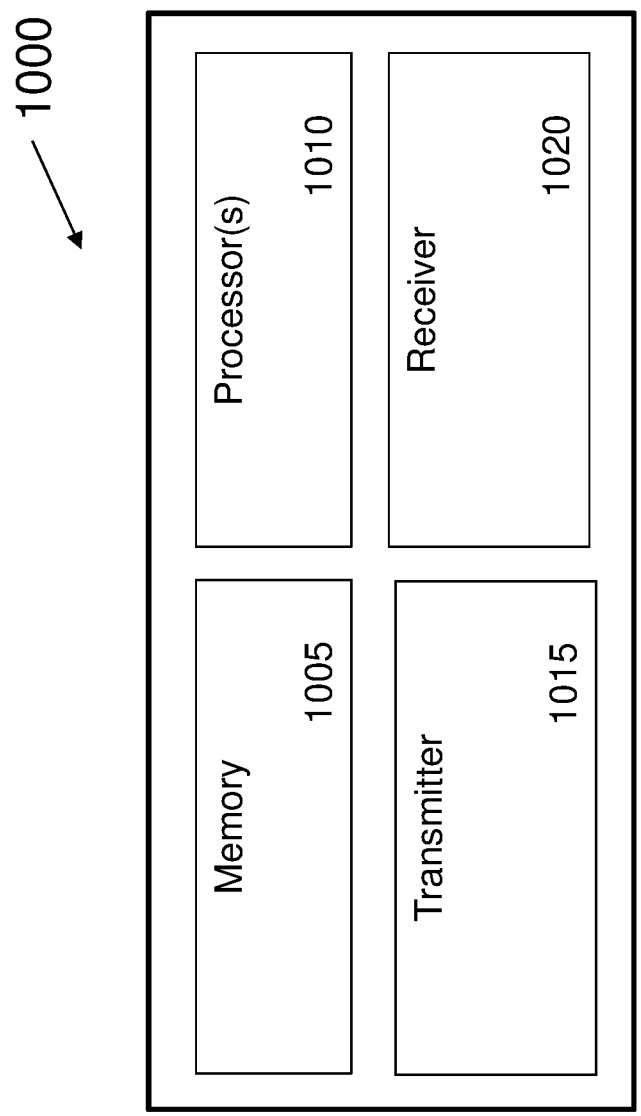
FIG. 10 depicts an apparatus, in accordance with some example embodiments.

FIG. 10 depicts a block diagram 1000 representing of a portion of a radio station. A radio station 1000 such as a base station or a wireless device (or UE) can include one or more processors 1010 such as a microprocessor that implements one or more of the wireless techniques presented in this document. The radio station 1000 can include transmitter electronics 1015 to send and receiver electronics 1020 to receive wireless signals over one or more communication interfaces such as an antenna. The radio station 1000 can include other communication interfaces for transmitting and receiving data. Radio station 1000 can include one or more memories 1005 configured to store information such as data and/or instructions. In some implementations, the processor electronics 1010 can include at least a portion of the transceiver electronics 1020/1015. In some embodiments, at least some of the disclosed techniques, modules or functions are implemented using the radio station 1000.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communications method, comprising:
   sending, from a first radio terminal to a second radio terminal, a grant message to allow transmission in a future time slot, wherein the future timeslot corresponds to resources of a dummy shared channel in a first direction; and
   scheduling one or more resources of a shared channel in a second direction with a corresponding acknowledgement that overlaps in time with the dummy shared channel in the first direction.

2. The method of claim 1, wherein a last message received at the second radio terminal is a last scheduled resource of the shared channel in the second direction or the grant message.

3. The method of claim 1, wherein one or more intervening messages comprising the one or more resources of the shared channel in the second direction are sent between the grant message and the corresponding acknowledgement.

4. A wireless communications method, comprising: sending, from a first radio terminal to a second radio terminal, a grant to allow transmission in a future time slot, wherein the future timeslot corresponds to resources of a non-dummy shared channel in a first direction; and forbidding scheduling of one or more resources of a shared channel in a second direction with a corresponding acknowledgement that overlaps in time with the non-dummy shared channel in the first direction.

5. The method of claim 4, wherein a last message received at the second radio terminal is the grant message.

6. A wireless communications method, comprising:
   sending, from a first radio terminal to a second radio terminal, a grant message to allow transmission in a future time slot, wherein the future timeslot corresponds to resources of a dummy shared channel in a first direction;
   sending one or more subsequent grants to schedule resources of a shared channel in a second direction with an acknowledgement that overlaps in time with the dummy shared channel in the first direction; and
   receiving a feedback acknowledgement codebook with a number of bits determined by an assignment indicator in a last sent grant.

7. The method of claim 6, wherein a last message received at the second radio terminal is a last scheduled resource of the shared channel in the second direction or the grant message.

8. A wireless communications method, comprising: sending, from a first radio terminal to a second radio terminal, a grant message to allow transmission in a future time slot, wherein the future timeslot corresponds to resources of a dummy shared channel in a first direction; and receiving a feedback acknowledgement codebook with a number of bits determined by an assignment indicator in a last sent grant when the first radio terminal does not send one or more subsequent grants to schedule resources of a shared channel in a second direction with an acknowledgement that overlaps in time with the dummy shared channel in the first direction.

9. The method of claim 8, wherein a last message received at the second radio terminal is the grant message.

10. A wireless communications method, comprising:
receiving, at a second radio terminal from a first radio terminal, a grant message to allow transmission in a future time slot, wherein the future timeslot corresponds to resources of a dummy shared channel in a first direction; and
receiving one or more resources of a shared channel in a second direction with corresponding acknowledgement that overlaps in time with the dummy shared channel in the first direction.

11. The method of claim 10, wherein a last message received at the second radio terminal is a last scheduled resource of the shared channel in the second direction.

12. The method of claim 10, wherein a last message received at the second radio terminal is the grant message.

13. The method of claim 10, wherein one or more intervening messages comprising the one or more resources of the shared channel in the second direction are sent between the grant message and the corresponding acknowledgement.

14. A wireless communications method, comprising: receiving, at a first radio from to a second radio terminal, a grant to allow transmission in a future time slot, wherein the future timeslot corresponds to resources of a non-dummy shared channel in a first direction; and failing to receive via one or more resources of a shared channel in a second direction with a corresponding acknowledgement that overlaps in time with the non-dummy shared channel in the first direction.

15. The method of claim 14, wherein a last message received at the second radio terminal is the grant message.

16. A wireless communications method, comprising:
receiving, at a first radio terminal from a second radio terminal, a grant message to allow transmission in a future time slot, wherein the future timeslot corresponds to resources of a dummy shared channel in a first direction;
receiving one or more subsequent grants to schedule resources of a shared channel in a second direction with an acknowledgement that overlaps in time with the dummy shared channel in the first direction; and
sending feedback acknowledgement codebook with a number of bits determined by an assignment indicator in a last received grant.

17. The method of claim 16, wherein a last message received at the second radio terminal is a last scheduled resource of the shared channel in the second direction.

18. The method of claim 16, wherein a last message received at the second radio terminal is the grant message.

19. A wireless communications method, comprising: receiving, at a first radio terminal from a second radio terminal, a grant message to allow transmission in a future time slot, wherein the future timeslot corresponds to resources of a dummy shared channel in a first direction; and sending a feedback acknowledgement codebook with a number of bits determined by an assignment indicator in a last received grant when the second radio terminal does not receive one or more subsequent grants to schedule resources of a shared channel in a second direction with an acknowledgement that overlaps in time with the dummy shared channel in the first direction.

20. The method of claim 19, wherein a last message received at the second radio terminal is the grant message.

\* \* \* \* \*

UNITED STATES PATENT AND TRADEMARK OFFICE
CERTIFICATE OF CORRECTION

PATENT NO. : 11,856,561 B2
APPLICATION NO. : 17/306270
DATED : December 26, 2023
INVENTOR(S) : Ting Fu et al.

It is certified that error appears in the above-identified patent and that said Letters Patent is hereby corrected as shown below:

On the Title Page
1. On Page 2, in Item (56), under OTHER PUBLICATIONS, in Column 2, Line 21, delete "I-IARQ-ACK" and insert --HARQ-ACK--
2. On Page 2, in Item (56), under OTHER PUBLICATIONS, in Column 2, Line 22, delete "Meeling" and insert --Meeting--

In the Specification
3. In Column 2, Line 44, delete "from to" and insert --from--
4. In Column 3, Line 52, delete "used" and insert --used by--
5. In Column 3, Line 66, delete "feed back" and insert --feedback--
6. In Column 4, Line 42, delete "(ie," and insert --(i.e.,--
7. In Column 6, Line 45, delete "overlappped" and insert --overlapped--
8. In Column 7, Line 63, delete "to a" and insert --a--
9. In Column 8, Line 29, delete "of a" and insert --a--
10. In Column 8, Line 35, delete "and receiver" and insert --transceiver--
11. In Column 8, Line 51, delete "as by" and insert --by--
12. In Column 8, Line 67, delete "more them." and insert --more of them.--

In the Claims
13. In Column 10, Line 34, in Claim 2, delete "direction" and insert --direction,--
14. In Column 10, Line 66, in Claim 7, delete "direction" and insert --direction,--
15. In Column 11, Line 36, in Claim 14, delete "from to" and insert --from--

Signed and Sealed this
Fourth Day of June, 2024

Katherine Kelly Vidal
*Director of the United States Patent and Trademark Office*